March 6, 1928.　　　　　　　　　　　　　　　1,661,310
O. C. SCHMIDT
VALVE MECHANISM
Filed Sept. 29, 1924
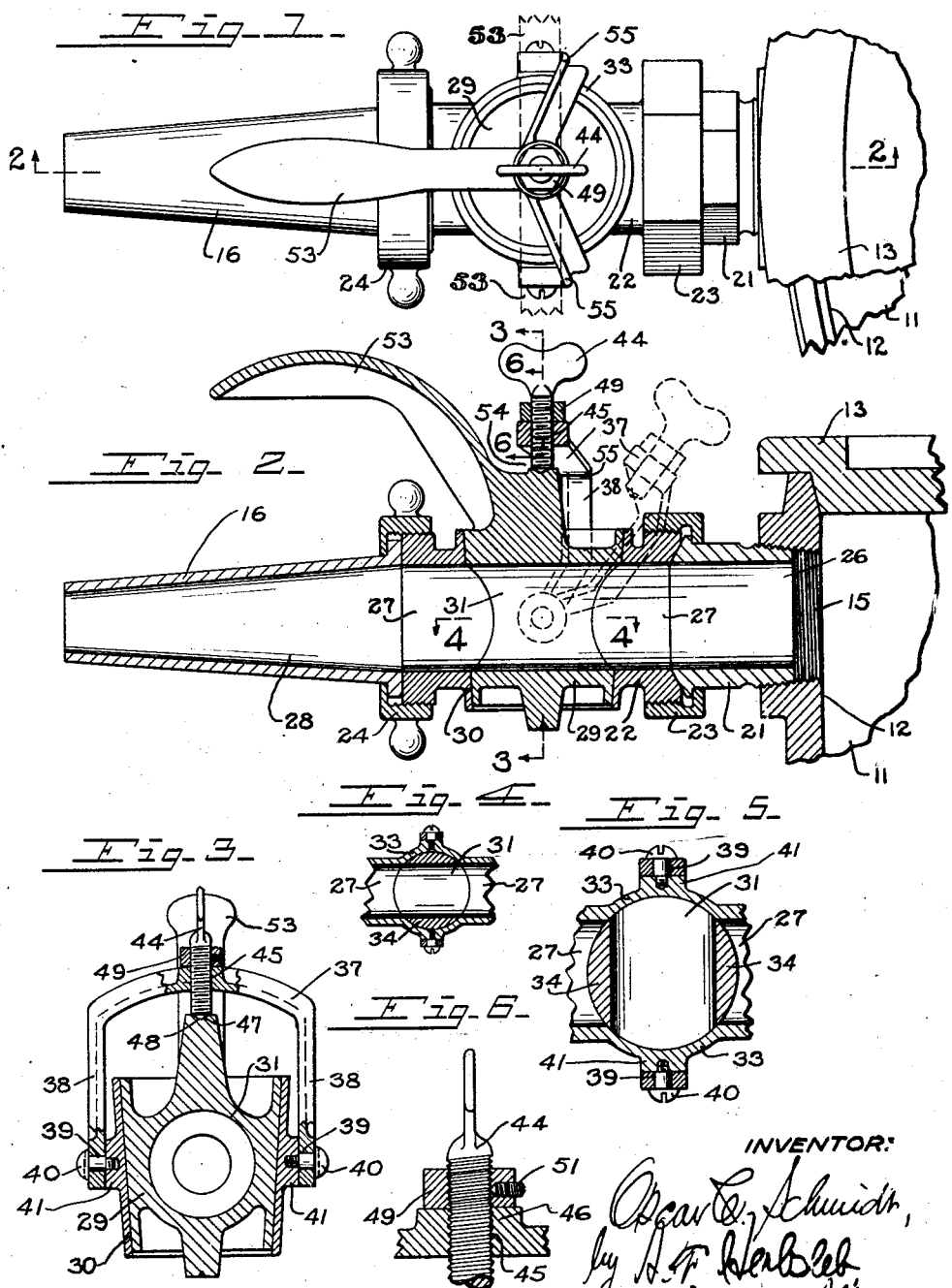
INVENTOR:
Oscar C. Schmidt,
by his Attorney Patented Mar. 6, 1928.

1,661,310

UNITED STATES PATENT OFFICE.

OSCAR C. SCHMIDT, OF CINCINNATI, OHIO, ASSIGNOR TO THE CINCINNATI BUTCHERS' SUPPLY COMPANY, OF CINCINNATI, OHIO, A CORPORATION OF OHIO.

VALVE MECHANISM.

Application filed September 29, 1924. Serial No. 740,443.

My invention relates to valve mechanism, especially applicable for sausage stuffers used for filling sausage casings, but is employable in other relations.

It is the object of my invention to provide novel means operating upon the handle end of the valve-plug for maintaining the valve-plug in its seat; and, further, to provide such valve-plug with a passage which is round and of as great area in cross-section as the passage in advance of and following said passage in the valve-plug.

It is the object of my invention, further, to provide a valve of the character mentioned comprising a valve-plug which is removable in novel manner for readily cleaning the passage used for feeding the meat in a sausage stuffer, and the various inner parts of the valve; further, to provide novel means for readily assembling the valve-plug in its valve-seat and for removing the same; further, to provide novel means for adjusting a conical valve-plug of the character mentioned in its valve-seat, and for maintaining such adjustments; and, further, to provide novel yoke means for securing the valve-plug in its seat, which forms stops for the valve-handle for left-handed and right-handed operations of the latter.

The invention will be further readily understood from the following description and claims, and from the drawings, in which latter:

Fig. 1 represents a plan view of my improved device in connection with so much of a sausage stuffing machine as is necessary to illustrate my invention.

Fig. 2 is a vertical section of the same, taken on the line 2—2 of Fig. 1.

Fig. 3 is a cross-section of the same, taken in the plane of the line 3—3 of Fig. 2, and including the yoke.

Fig. 4 is a horizontal section, taken in the plane of the line 4—4 of Fig. 2, showing the valve open.

Fig. 5 is a similar view, showing the valve closed; and,

Fig. 6 is a vertical cross-sectional detail, taken in the plane of the line 6—6 of Fig. 2.

A portion of the pressure casing of a usual sausage stuffing machine is exemplified at 11. The casing comprises a usual cylindrical wall 12, at the upper end of which there is a removable cover 13. Proximate to the upper end of the wall there is a discharge opening 15. A plunger or piston operates in the casing and has the body of sausage meat thereabove, air pressure being introduced below the plunger or piston for forcing the plunger or piston lengthwise of the casing toward the discharge opening for forcing the sausage meat by pressure through the discharge opening.

The sausage meat is forced through a passage, including a valve for controlling the flow of sausage meat therethrough to a nozzle 16, over the outer periphery of which the sausage casing is positioned for receiving the meat therein to form the cased sausage.

A nipple 21 is threaded into the discharge opening. A valve-casing 22 is located between the nipple and the nozzle, being secured thereto respectively by glands 23, 24, threaded over the outer peripheries of the threaded ends of the valve-casing for securely connecting the valve-casing to the nipple and the nozzle to the valve-casing. The nipple is provided with a discharge-passage 26, and the valve-casing with passages 27 respectively in advance of and following the valve-plug. The nozzle is provided with a discharge passage 28. A valve-plug 29 is in the valve-casing and is represented as a conical valve-plug seated in a conical valve-seat 30 of the valve-casing. It is provided with a passage 31.

The passages 27 are cylindrical. The passage 31 is also preferably of cylindrical form and of a diameter as great as the diameters of the passages 27 and of the passage 26 and in line with said passages, so that the flow of the material through the valve is not constricted or changed in direction, thereby saving power applied in exuding the material.

In my improved device I provide the valve-casing with lateral bulges, as shown at 33, for enabling me to provide a conical valve-plug which has a passage of cylindrical form and of a diameter as great as the passages in the valve-casing, and for accommodating the side walls 34 of said passage in the valve-plug and for providing such side walls sufficiently large to close the passages in the valve-casing, the widths of the narrowest portions of said side walls being substantially equal to the diameters of said passages. (Compare Figs. 2, 4 and 5.)

I have provided means for readily dismantling the valve, so that all of the passages may be readily cleaned, which is an important feature in machinery of the character exemplified.

Thus I provide a yoke 37, which comprises side arms 38 having bearings 39 pivoted on shoulder screws 40, threaded into lugs 41 at the outside of the outwardly bulged portions 33 of the valve-seat.

Means are provided between the yoke and the valve-plug for securing the valve-plug in the valve-casing and for adjusting the valve-plug in its seat. Thus the yoke extends above the axis of the valve-plug and has a screw 44 received through a threaded hole 45 in a bearing 46 of the yoke, the screw being shown as a thumb-screw having a conical end 47 received in a conical seat 48 in the valve-plug, which conical seat is concentric with the axis of the valve-plug. A jam-nut 49 is threaded about the screw and is arranged to form a seat on the bearing 46 for limiting the inward movement of the screw, whereby the screw is firmly fixed in place for proper seating of the valve-plug in the valve-seat.

The screw may be unthreaded in its threaded bearing out of its seat 48, whereupon the yoke may be swung away from the valve-plug, so that the valve-plug is readily removable from its seat, and ready access provided to all the passages and the valve-plug, for readily and thoroughly cleaning the same.

When the valve-plug is replaced, the yoke is returned to obstructing position and the screw screwed toward the valve-plug, for seating it in its valve-seat, the nut limiting this inward movement for locating the valve-plug in its seat in correct position for readily turning the same and preventing leakage between the valve-plug and its seat.

I prefer to provide means for securing the nut in adjusted positions, exemplified as a set-screw 51, having threaded connection with the nut, and impinging the set screw for securing the nut in adjusted positions for properly reseating the valve-plug on replacements of the same.

The valve-plug is provided with a handle 53, by means of which it may be opened and closed, means being provided for permitting the handle to be swung to the left or to the right for either left-handed or right-handed operation, limiting means being provided for limiting the movements of the valve-plug toward the right and toward the left at positions at which its passage is in line with the passages of the valve-seat.

For this purpose I provide the yoke with recesses 54, the recesses being shown formed by rearward bends in the respective sides of the yoke, the upper arms of the yoke receding in the direction of the valve-passages, and the side arms of the yoke having bends 55 therein, for permitting the handle of the valve-plug to be received in the recesses formed by said bends, the side arms thus forming stops, as shown by the dotted positions of the handle in Fig. 1, for locating the valve in extremely open positions. The recesses also provide clearance spaces for the valve-plug when removing the latter.

My improved device forms an exceptionally strong valve mechanism of great capacity for ready flow of the prepared sausage meat from the sausage stuffer to the sausage casing, in the exemplification stated, provides convenient means for ready access to and cleaning of the valve mechanism, provides for ready adjusting and maintenance of adjustments for the valve-plug, and ready means for left-hand and right-hand operations of the same.

As the valve-plug wears, the screw 44 may be turned for firmly reseating the valve-plug in its valve-seat, the nut 49 being fixed in a new location for the new adjustment.

Having thus fully described my invention, what I claim as new, and desire to secure by Letters Patent, is:

1. In valve mechanism of the character described, the combination of a valve-casing having a conical valve-seat, a conical valve-plug therein, said valve-casing and said valve-plug provided with passages which are substantially alined when in open relation and of substantially equal cross-sectional areas, said valve-plug provided with side walls at the respective sides of the passage therein, which side walls at their narrowest portions are of a width substantially equal to the diameter of said last-named passage, said valve-casing provided with lateral enlargements in which said side walls are received when said passages are alined, a yoke comprising side arms at the sides of said valve-casing, pivotal connecting means between the ends of said side arms and said enlargements of said valve-casing, said side arms having recesses therein extending in the direction of said alined passages, said yoke provided with an extension extending along the axis of said valve-plug at the end of larger diameter of said valve-plug, means between said extension and said valve-plug whereby to adjustably seat said valve-plug in said valve-casing, means for fixing said last-named means for repeated similar reseatings of said valve-plug, and a handle for said valve-plug at the end of larger diameter of said valve-plug arranged to be moved to the right and to the left of said valve-casing for locating the major axis of said handle perpendicular to the axis of said alined passages in said valve-casing and parallel with said last-named alined passages for respectively open relation and closed relation of said valve, and the body portion of said handle at the respective sides of said major axis thereof received in said recesses in said arms at the respective sides of said valve-casing for complete openings of said valve.

2. In valve mechanism of the character described, the combination of a valve-casing having a valve-seat, an inlet-port and an outlet port, a valve-plug in said valve-seat, said valve-plug having a passage therethrough of as great cross-sectional area as each of said ports and side walls at the respective sides of said passage, said casing provided with side outwardly bulging enlargements in which said side walls are received when said valve is open, a handle on said plug, a yoke pivoted to said enlargements and provided with a lug in axial line with said plug and with recesses respectively at the sides of said lug, said handle arranged to be placed at right angles to the axes of said ports and received in said recesses when said passage is in line with said ports for full open relation of said valve whereby a maximum amount of movement is provided for said handle for opening and closing said valve, and the walls of said recesses forming stops for said handle when said passage is in such fully open relation, and an adjustable connection between said lug and said plug.

OSCAR C. SCHMIDT.